(12) United States Patent
Kurian et al.

(10) Patent No.: US 10,679,215 B2
(45) Date of Patent: Jun. 9, 2020

(54) SYSTEM FOR CONTROL OF DEVICE IDENTITY AND USAGE IN A PROCESS DATA NETWORK

(71) Applicant: BANK OF AMERICA CORPORATION, Charlotte, NC (US)

(72) Inventors: Manu Jacob Kurian, Dallas, TX (US); Joseph Benjamin Castinado, North Glenn, CO (US); Richard Huw Thomas, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 931 days.

(21) Appl. No.: 15/049,716

(22) Filed: Feb. 22, 2016

(65) Prior Publication Data
US 2017/0243208 A1    Aug. 24, 2017

(51) Int. Cl.
G06Q 40/00       (2012.01)
G06Q 20/40       (2012.01)
(Continued)

(52) U.S. Cl.
CPC .......... *G06Q 20/40* (2013.01); *G06Q 20/322* (2013.01); *G06Q 20/3227* (2013.01);
(Continued)

(58) Field of Classification Search
CPC ..................................................... G06Q 40/00
(Continued)

(56) References Cited

U.S. PATENT DOCUMENTS 5,671,283 A    9/1997   Michener et al.
5,835,599 A    11/1998  Buer
(Continued)

FOREIGN PATENT DOCUMENTS

WO    2014162296 A1    10/2014
WO    2015135018 A1     9/2015

OTHER PUBLICATIONS

Buterin, Vitalik, "On Public and Private Blockchains", Aug. 7, 2015, https://blog.ethereum.org/2015/08/07/on-public-and-private-blockchains/.
(Continued)

*Primary Examiner* — Ojo O Oyebisi
(74) *Attorney, Agent, or Firm* — Michael A. Springs; Moore & Van Allen PLLC; Anup Shrinivasan Iyer

(57) ABSTRACT

Systems, computer program products, and methods are described herein for a system for control of device identity and usage in a process data network. The present invention is configured to receive an indication that a user has executed a transaction using a mobile device; receive a request to validate mobile device identity; retrieve financial credentials from the mobile device; retrieve device information associated with the mobile device used in the execution of the transaction; determine whether the retrieved financial credentials and the device information meet a condition of the block chain; receive an indication that the retrieved financial credentials and the device information meet the condition of the block chain thereby validating the request; and allow the execution of the transaction to be completed based on at least receiving the indication that the retrieved financial credentials and the device information meet the condition of the block chain.

20 Claims, 7 Drawing Sheets

(51) Int. Cl.
  *G06Q 20/32* (2012.01)
  *G06Q 20/38* (2012.01)
  *H04L 9/32* (2006.01)
(52) U.S. Cl.
  CPC ....... *G06Q 20/3821* (2013.01); *H04L 9/3236* (2013.01); *G06Q 2220/00* (2013.01); *H04L 2209/38* (2013.01); *H04L 2209/56* (2013.01)
(58) Field of Classification Search
  USPC .......................................................... 705/44
  See application file for complete search history.

(56) References Cited

U.S. PATENT DOCUMENTS

| | | | |
|---|---|---|---|
| 6,073,234 A | 6/2000 | Kigo et al. | |
| 6,324,286 B1 | 11/2001 | Lai et al. | |
| 6,725,303 B1 | 4/2004 | Hoguta et al. | |
| 6,850,252 B1 | 2/2005 | Hoffberg | |
| 6,973,187 B2 | 12/2005 | Gligor et al. | |
| 7,055,039 B2 | 5/2006 | Chavanne et al. | |
| 7,092,400 B2 | 8/2006 | Malzahn | |
| 7,184,549 B2 | 2/2007 | Sorimachi et al. | |
| 7,362,859 B1 | 4/2008 | Robertson et al. | |
| 7,392,384 B2 | 6/2008 | Hopkins et al. | |
| 7,428,306 B2 | 9/2008 | Celikkan et al. | |
| 7,502,933 B2 | 3/2009 | Jakobsson et al. | |
| 7,574,401 B1 | 8/2009 | Burns | |
| 7,649,992 B2 | 1/2010 | Raju et al. | |
| 7,764,788 B2 | 7/2010 | Tardo | |
| 7,979,889 B2 | 7/2011 | Gladstone et al. | |
| 8,078,874 B2 | 12/2011 | You et al. | |
| 8,107,621 B2 | 1/2012 | Celikkan et al. | |
| 8,155,311 B2 | 4/2012 | Shin et al. | |
| 8,259,934 B2 | 9/2012 | Karroumi et al. | |
| 8,358,781 B2 | 1/2013 | Schneider | |
| 8,397,841 B1 | 2/2013 | Taylor et al. | |
| 8,396,209 B2 | 3/2013 | Schneider | |
| 8,416,947 B2 | 4/2013 | Schneider | |
| 8,458,461 B2 | 6/2013 | Tardo | |
| 8,464,320 B2 | 6/2013 | Archer et al. | |
| 8,516,266 B2 | 8/2013 | Hoffberg et al. | |
| 8,590,055 B2 | 11/2013 | Yoon et al. | |
| 8,737,606 B2 | 5/2014 | Taylor et al. | |
| 8,942,374 B2 | 1/2015 | Fujisaki | |
| 8,983,063 B1 | 3/2015 | Taylor et al. | |
| 9,059,866 B2 | 6/2015 | Bar-Sade et al. | |
| 9,083,702 B2 | 7/2015 | Wied et al. | |
| 9,092,766 B1 | 7/2015 | Bedier et al. | |
| 9,298,806 B1 | 3/2016 | Vessenes et al. | |
| 9,635,000 B1 | 4/2017 | Muftic | |
| 9,672,499 B2 | 6/2017 | Yang et al. | |
| 2003/0126094 A1 | 7/2003 | Fisher et al. | |
| 2004/0172535 A1 | 9/2004 | Jakobsson et al. | |
| 2005/0256802 A1 | 11/2005 | Ammermann et al. | |
| 2006/0059539 A1 | 3/2006 | Shashikumar et al. | |
| 2009/0281948 A1 | 11/2009 | Carlson | |
| 2010/0279653 A1 | 11/2010 | Poltorak | |
| 2011/0078073 A1 | 3/2011 | Annappindi | |
| 2011/0197064 A1 | 8/2011 | Garcia Morchon et al. | |
| 2012/0066121 A1 | 3/2012 | Shahbazi et al. | |
| 2012/0284175 A1 | 11/2012 | Wilson et al. | |
| 2013/0198061 A1 | 8/2013 | Dheer et al. | |
| 2013/0232056 A1 | 9/2013 | Schulman | |
| 2013/0311375 A1 | 11/2013 | Priebatsch | |
| 2014/0006185 A1 | 1/2014 | Zurn et al. | |
| 2014/0089243 A1 | 3/2014 | Oppenheimer | |
| 2014/0310171 A1 | 10/2014 | Grossman et al. | |
| 2015/0052587 A1 | 2/2015 | O'Neill et al. | |
| 2015/0172053 A1 | 6/2015 | Schwarz et al. | |
| 2015/0206106 A1 | 7/2015 | Yago | |
| 2015/0332283 A1 | 11/2015 | Witchey | |
| 2015/0379510 A1 | 12/2015 | Smith | |
| 2015/0379636 A1 | 12/2015 | Szabo et al. | |
| 2016/0012424 A1 | 1/2016 | Simon et al. | |
| 2016/0028552 A1 | 1/2016 | Spanos et al. | |
| 2016/0050203 A1 | 2/2016 | Hefetz | |
| 2016/0092874 A1 | 3/2016 | O'Regan et al. | |
| 2016/0125376 A1 | 5/2016 | Beatty et al. | |
| 2016/0125414 A1 | 5/2016 | Desai et al. | |
| 2016/0191243 A1 | 6/2016 | Manning | |
| 2016/0275461 A1 | 9/2016 | Sprague et al. | |
| 2016/0292672 A1 | 10/2016 | Fay et al. | |
| 2016/0321654 A1 | 11/2016 | Lesavich et al. | |
| 2016/0323109 A1 | 11/2016 | McCoy et al. | |
| 2016/0342978 A1 | 11/2016 | Davis et al. | |
| 2016/0342989 A1 | 11/2016 | Davis | |
| 2016/0342994 A1 | 11/2016 | Davis | |
| 2017/0005804 A1 | 1/2017 | Zinder | |
| 2017/0046526 A1 | 2/2017 | Chan et al. | |
| 2017/0046664 A1 | 2/2017 | Haldenby et al. | |
| 2017/0046680 A1 | 2/2017 | Crites | |
| 2017/0053249 A1* | 2/2017 | Tunnell | H04L 9/3226 |
| 2017/0091397 A1 | 3/2017 | Shah | |
| 2017/0103167 A1 | 4/2017 | Shah | |
| 2017/0103461 A1 | 4/2017 | Acuña-Rohter et al. | |
| 2017/0116693 A1 | 4/2017 | Rae et al. | |
| 2017/0132625 A1 | 5/2017 | Kennedy | |
| 2017/0132626 A1 | 5/2017 | Kennedy | |
| 2017/0132630 A1 | 5/2017 | Castinado et al. | |
| 2017/0140375 A1 | 5/2017 | Kunstel | |
| 2017/0163733 A1 | 6/2017 | Grefen et al. | |
| 2017/0177855 A1 | 6/2017 | Costa Faidella et al. | |
| 2017/0178131 A1 | 6/2017 | Fernandez et al. | |
| 2017/0178237 A1 | 6/2017 | Wong | |
| 2017/0180134 A1 | 6/2017 | King | |
| 2017/0200137 A1 | 7/2017 | Vilmont | |
| 2017/0213209 A1 | 7/2017 | Dillenberger | |
| 2017/0214675 A1 | 7/2017 | Johnsrud et al. | |
| 2017/0214698 A1 | 7/2017 | Hughes et al. | |
| 2017/0220998 A1 | 8/2017 | Horn et al. | |
| 2017/0221052 A1 | 8/2017 | Sheng et al. | |
| 2017/0223005 A1 | 8/2017 | Birgisson et al. | |
| 2017/0228447 A1 | 8/2017 | Catania et al. | |
| 2017/0230378 A1 | 8/2017 | Bliss | |
| 2017/0232300 A1 | 8/2017 | Tran et al. | |
| 2017/0235955 A1 | 8/2017 | Barkan | |
| 2017/0236407 A1 | 8/2017 | Rhoads et al. | |
| 2017/0243020 A1 | 8/2017 | Dhondse et al. | |
| 2018/0053161 A1 | 2/2018 | Bordash et al. | |
| 2018/0268479 A1 | 9/2018 | Dowling et al. | |

OTHER PUBLICATIONS

Tasca. "Digital currencies: Principles, trends, opportunities, and risks." In: Trends, Opportunities, and Risks. Sep. 7, 2015 (Sep. 7, 2015) Retrieved from <https://www.researchgate.net/profile/Paolo_Tasca/publication/290805276 Digital Currencies Principles Trends Opportunities and Risks/links/569bb91e08ae6169e5624552.pif> p. 5, 10, 12, 14.

Lerner. "MAVEPAY a new lightweight payment scheme for peer to peer currency networks." Apr. 17, 2012 (Apr. 17, 2012) Retrieved from <https://pdfs.semanticscholar.org/1185/a26f014678b959876519065c2624458d75b8.pdf>, entire document.

International Search Report and Written Opinion for PCT/US2016/061402 dated Dec. 27, 2016.

Malahov, Yanislav Georgiev, "BitAlias 1, Aka Usernames for Bitcoin, A New, Simple Naming System for Bitcoin Addresses", retrieved from https://medium.com/bitalias-decentralized-naming-and-identity-service/bitalias-7b66bffed9d8 on Mar. 12, 2017; Bringing Crypto to the People, Founder of www.aeternity.com, Jun. 6, 2015.

International Search Report for International Application No. PCT/IB16/01655 dated Mar. 11, 2017.

Written Opinion for International Application No. PCT/IB16/01655 dated Mar. 12, 2017.

Bradley Hope et al., "A Bitcoin Technology Gets Nasdaq Test"; May 10, 2015; retrieved from http://www.wsj.com/articles/a-bitcoin-technology-gets-nasdaq-test-1431296886.

Nathaniel Popper, "Bitcoin Technology Piques Interest on Wall Street"; Aug. 28, 2015 retrieved from http://www.nytimes.com/2015/08/31/business/dealbook/bitcoin-techno, Aug. 31, 2015.

(56) References Cited

OTHER PUBLICATIONS

Joseph C. Guagliardo et al., "Blockchain: Preparing for Disruption Like It's the '90s"; Mar. 14, 2016, retrieved from http://www.law360.com/articles/77120CVprint?section=ip.

Robert McMillian, "IBM Bets on Bitcoin Ledger"; Feb. 16, 2016, retrieved from http://www.wsj.com/articles/ibm-bets-on-bitcoin-ledger-1455598864.

Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_technology_JANUARY_2015_RICHARD_LEE_TWESIGE/links/54a7836f0cf267bdb90a0ee6.pdf.

* cited by examiner

SYSTEM FOR CONTROL OF DEVICE IDENTITY AND USAGE IN A PROCESS DATA NETWORK

BACKGROUND

The use of mobile devices for access to secure identity applications is an emerging market that leverages the functionality and security built into mobile devices. This typically includes establishing a digital identity certificate to be stored in the mobile device that represents a person, organization, application, or device associated with the mobile device for identity verification thereby eliminating the need for multiple identification. Such mobile devices may still be conducive to unauthorized access by external sources depending on a level of security associated with the mobile device. There is a need for a system for managing a user's device identity by tracking and managing the user's financial activity using mobile device via block chain management techniques.

BRIEF SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system operatively connected with a block chain distributed network and for using the block chain distributed network for control of device identity and usage in a process data network is presented. The system comprising: a memory device storing logic and rules for the block chain; and a processing device operatively coupled to the memory device, wherein the processing device is configured to execute computer-readable program code to: receive an indication that a user has executed a transaction using a mobile device; receive a request to validate device identity associated with the mobile device; retrieve financial credentials associated with the user from the mobile device, wherein the financial credentials are associated with a financial institution; retrieve device information associated with the mobile device used in the execution of the transaction; determine whether the retrieved financial credentials and the device information meet a condition of the block chain; receive an indication that the retrieved financial credentials and the device information meet the condition of the block chain thereby validating the request; and allow the execution of the transaction to be completed based on at least receiving the indication that the retrieved financial credentials and the device information meet the condition of the block chain.

In some embodiments, the processing device is configured to execute computer-readable program code further to: receive a request from a user to enable the mobile device to be used as a payment instrument for conducting a transaction; initiate a presentation of a user interface for display on the mobile device of the user, wherein the user interface comprises one or more financial institution accounts associated with the user; receive, via the user interface, a user selection of at least one of the one or more financial institution accounts, wherein the user selection indicates that funds from the selected financial institution accounts be used in any transaction executed by the user using the mobile device; and receive, via the user interface, one or more financial credentials associated with the selected financial institution accounts to be stored on the mobile device.

In some embodiments, wherein the processing device is configured to execute computer-readable program code further to: receive a request from the financial institution to access the block chain; determine that a financial institution associated with the financial credentials is a member institution; enable the financial institution to access the block chain; receive a request from the financial institution to post the device record to the block chain; and post the device record to the block chain.

In some embodiments, the processing device is configured to execute computer-readable program code further to: post the device record to the block chain with a signature and an authentication key indicating that the mobile device is validated.

In some embodiments, the processing device is configured to execute computer-readable program code further to: enable the financial institution to validate the device identity prior to adding the device record to the block chain.

In some embodiments, the processing device is configured to execute computer-readable program code further to: receive one or more authentication credentials from the financial institution to enable the financial institution to access the block chain; validate the one or more authentication credentials; and enable the financial institution to access the block chain in response to validating the one or more authentication credentials.

In some embodiments, the processing device is configured to execute computer-readable program code further to: establish a communication link with the mobile device, wherein establishing further comprises creating a wireless data channel with the mobile device; initiate, via the established communication link, a presentation of a user interface, the user interface comprising one or more mobile devices used by the user to execute the transaction; receive, via the established communication link, a user selection of a mobile device indicating that the selected mobile device is the most current mobile device being used to execute transactions; retrieve device information associated with the selected mobile device; and update the block chain with the device information associated with the selected mobile device.

In some embodiments, the processing device is configured to execute computer-readable program code further to: receive, via the established communication link, an input from the user to add information associated with a new mobile device indicating that the new mobile device replace the existing mobile device being used to execute a transaction; retrieve, via the established communication link, device information associated with the new mobile device; update the block chain with the device information associated with the new mobile device.

In another aspect, a computerized method for using the block chain distributed network for control of device identity and usage in a process data network is presented. The method comprising: receiving an indication that a user has executed a transaction using a mobile device; receiving a request to validate device identity associated with the mobile device; receiving financial credentials associated with the user from the mobile device, wherein the financial credentials are associated with a financial institution; receiving device information associated with the mobile device used in the execution of the transaction; determining whether the retrieved financial credentials and the device information meet a condition of the block chain; determining an indication that the retrieved financial credentials and the device information meet the condition of the block chain thereby validating the request; and allowing the execution of the transaction to be completed based on at least receiving the indication that the retrieved financial credentials and the device information meet the condition of the block chain.

In yet another aspect, a computer program product for execution on a system operatively connected with the block chain distributed network is presented. The computer program product for using the block chain distributed network for control of device identity and usage in a process data network, the computer program product comprising at least one non-transitory computer-readable medium having computer-readable program code portions embodied therein, the computer-readable program code portions comprising: an executable portion configured to receive an indication that a user has executed a transaction using a mobile device; an executable portion configured to receive a request to validate device identity associated with the mobile device; an executable portion configured to retrieve financial credentials associated with the user from the mobile device, wherein the financial credentials are associated with a financial institution; an executable portion configured to retrieve device information associated with the mobile device used in the execution of the transaction; an executable portion configured to determine whether the retrieved financial credentials and the device information meet a condition of the block chain; an executable portion configured to receive an indication that the retrieved financial credentials and the device information meet the condition of the block chain thereby validating the request; and an executable portion configured to allow the execution of the transaction to be completed based on at least receiving the indication that the retrieved financial credentials and the device information meet the condition of the block chain.

BRIEF DESCRIPTION OF THE DRAWINGS

Figure 1:
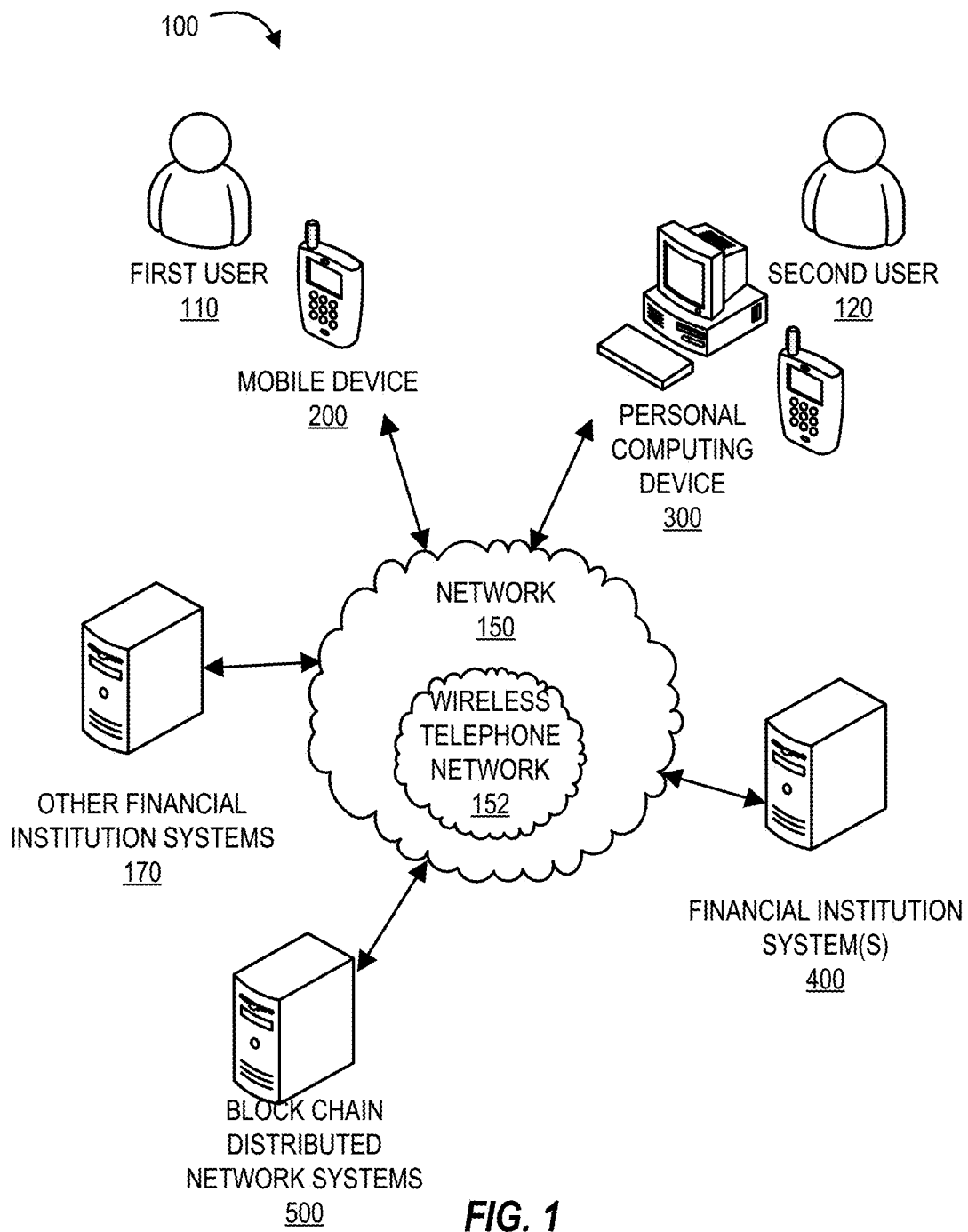
Figure 2:
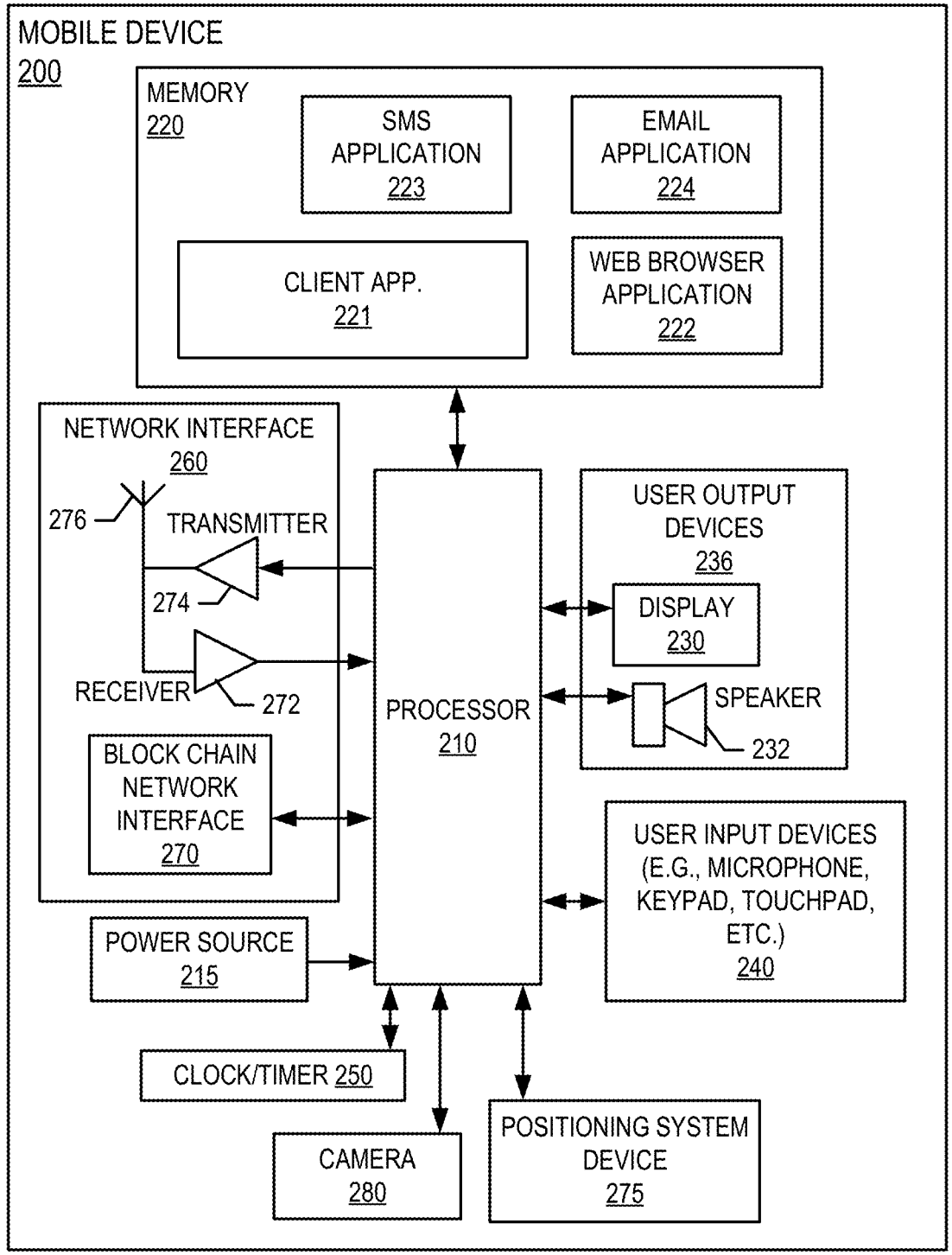
Figure 3:
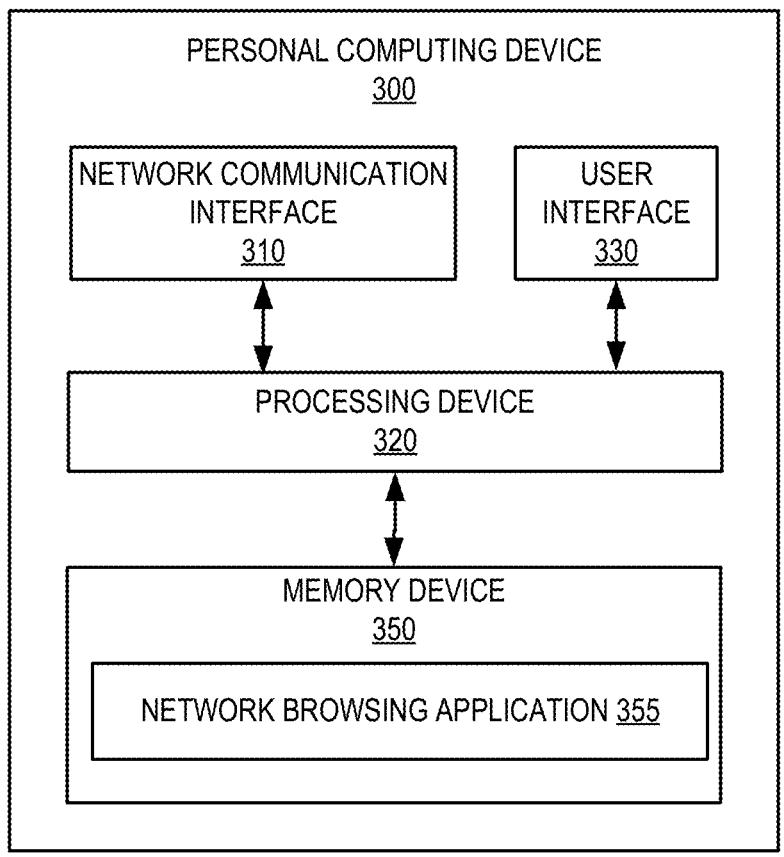
Figure 4:
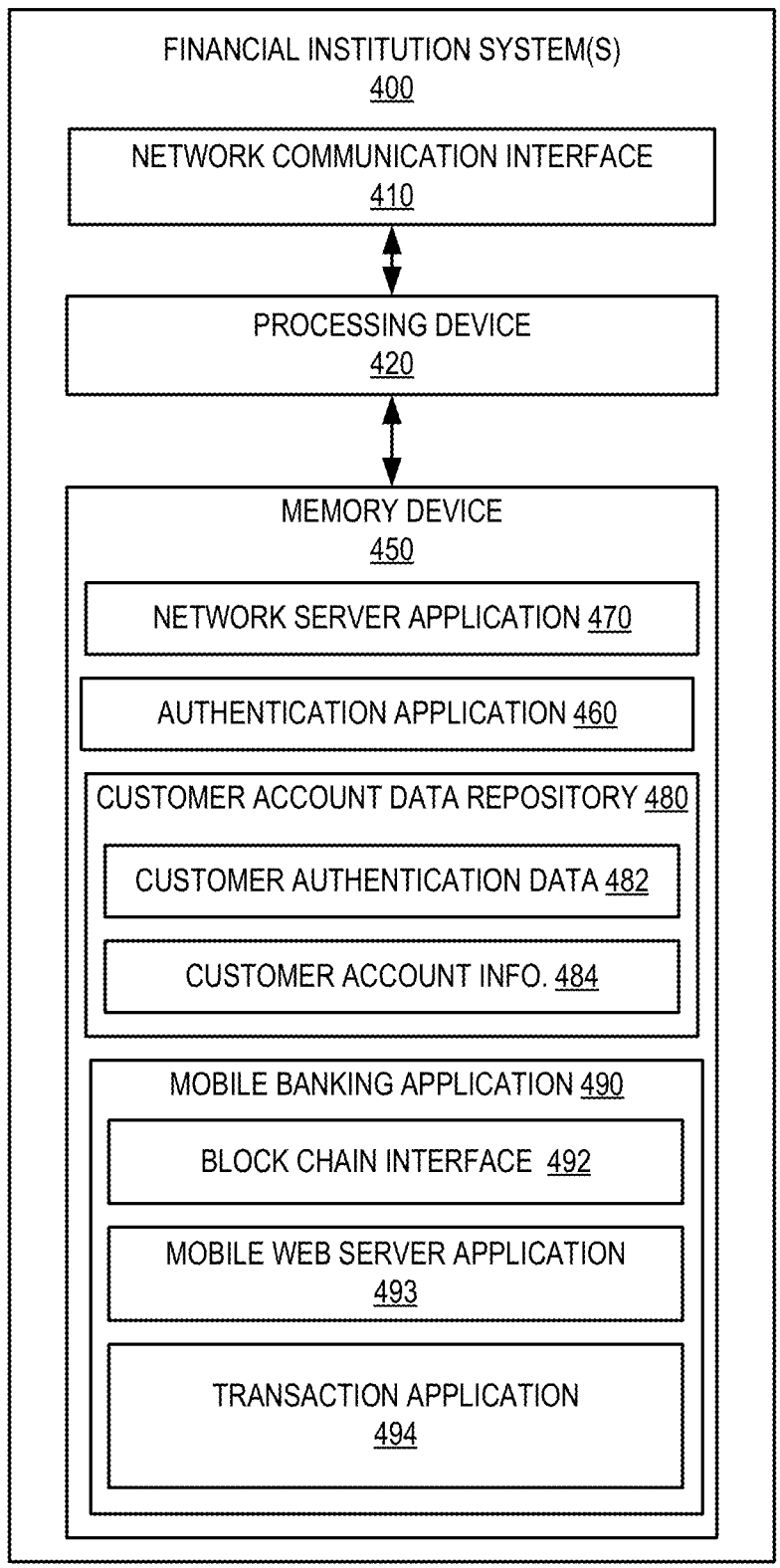
Figure 5:
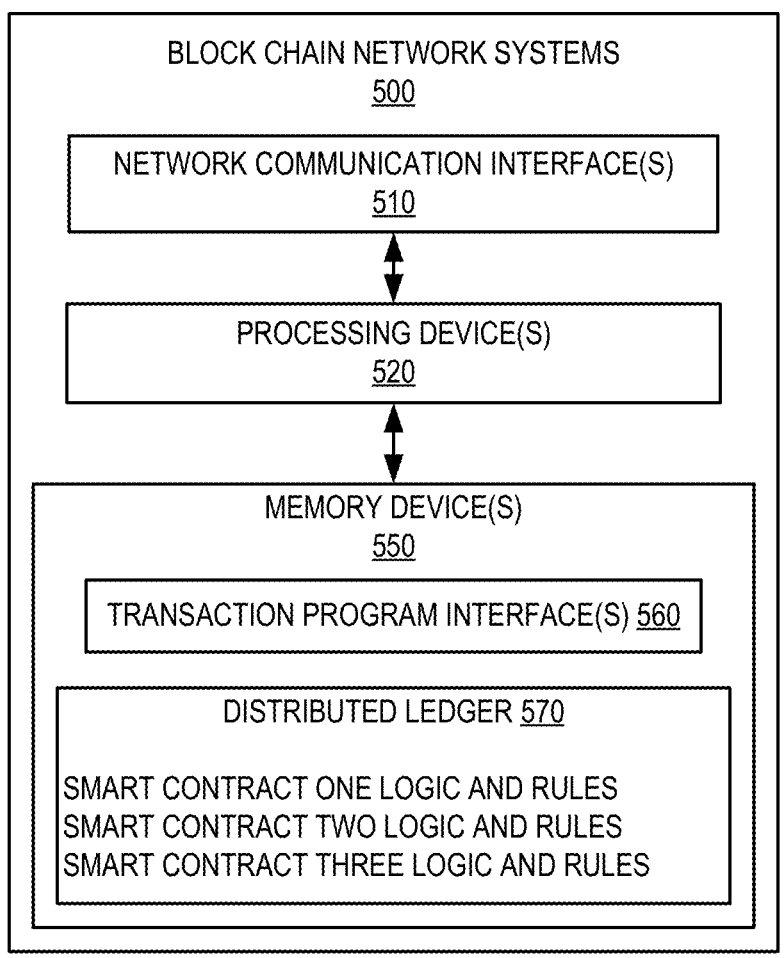
Figure 6A:
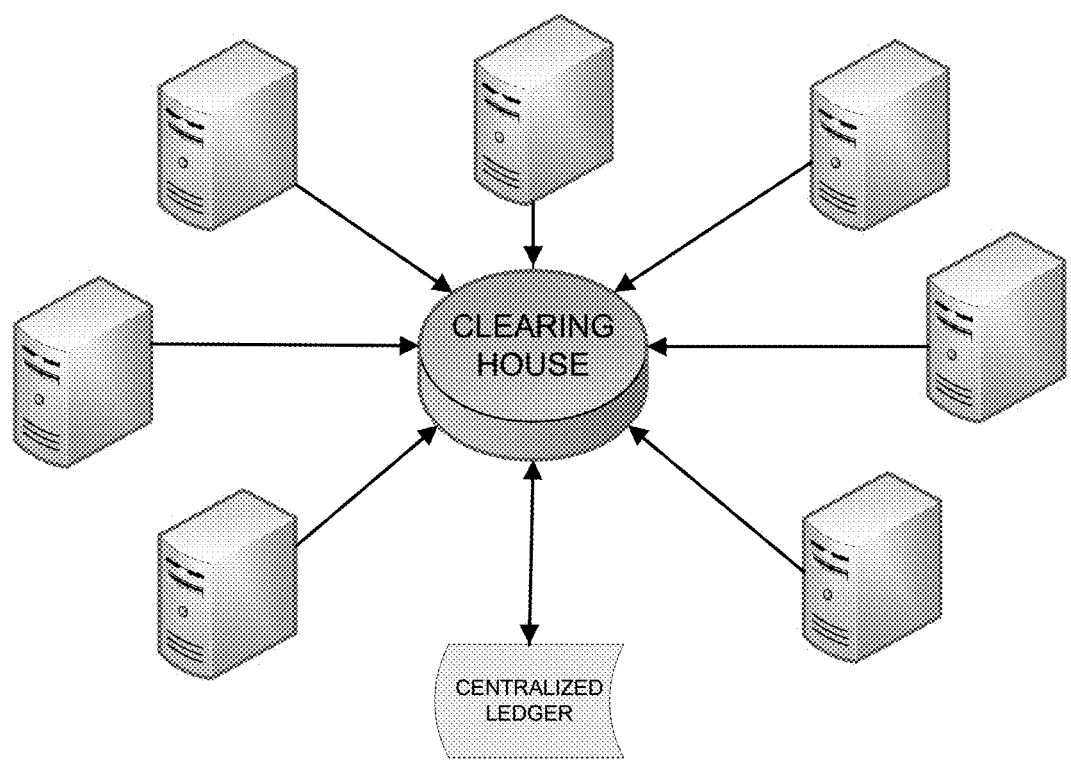
Figure 6B:
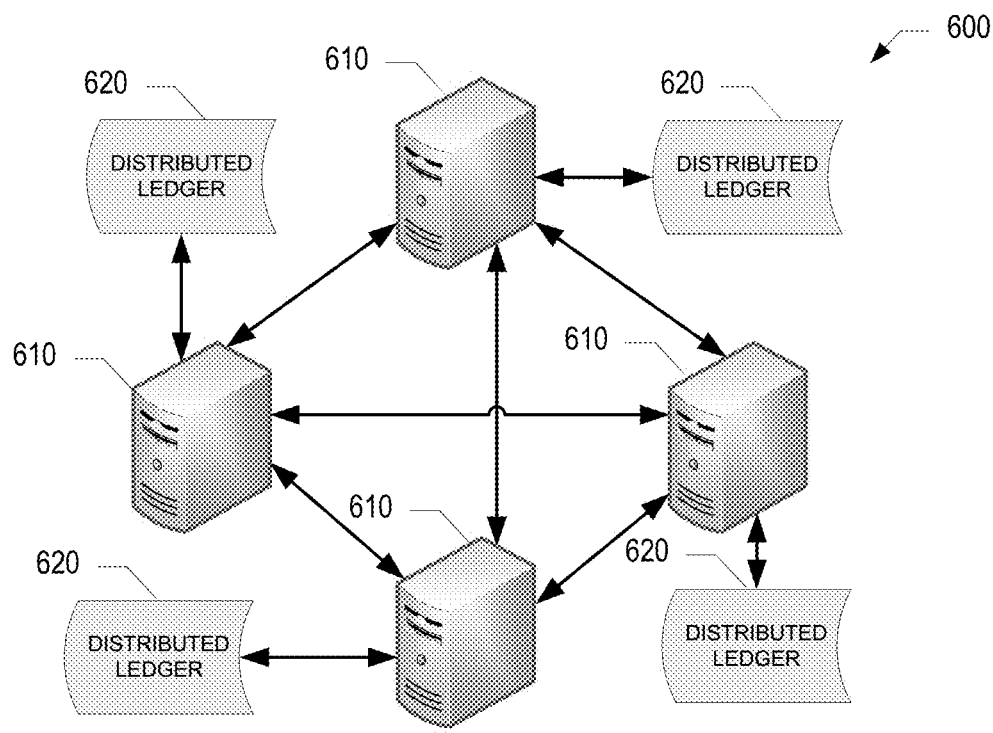
Figure 7:
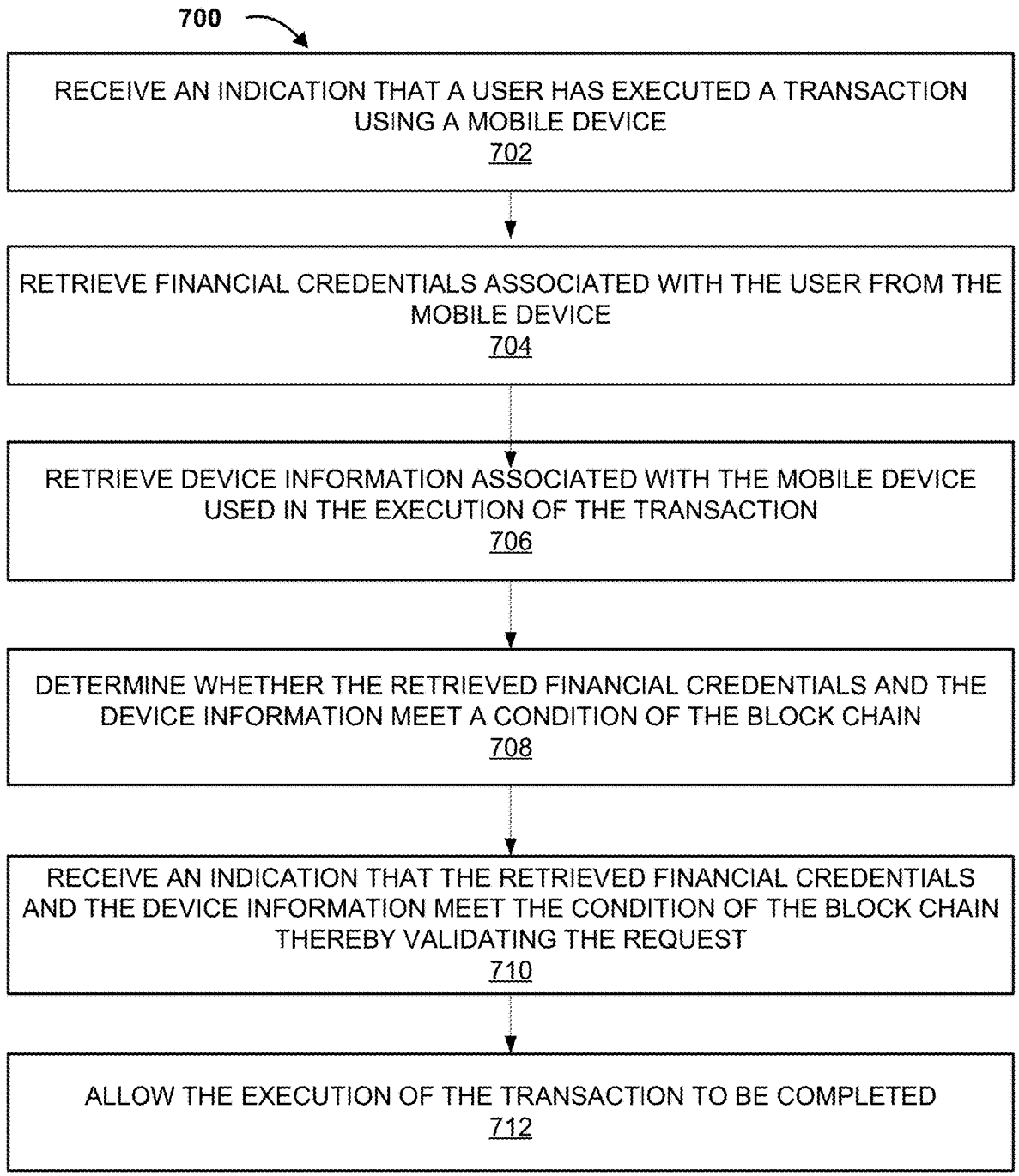

Having thus described embodiments of the invention in general terms, reference will now be made to the accompanying drawings, where:

FIG. 1 provides a block diagram illustrating a smart contract block chain system environment for control of device identity and usage in a process data network, in accordance with embodiments of the invention;

FIG. 2 provides a block diagram illustrating the first user's mobile computing device of FIG. 1, in accordance with embodiments of the invention;

FIG. 3 provides a block diagram illustrating the second user's personal computing device of FIG. 1, in accordance with embodiments of the invention;

FIG. 4 provides a block diagram illustrating the financial institution system(s) of FIG. 1, in accordance with embodiments of the invention;

FIG. 5 provides a block diagram illustrating the block chain network systems of FIG. 1, in accordance with embodiments of the invention;

FIG. 6A is a diagram illustrating a centralized clearinghouse network configuration, in accordance with embodiments of the invention;

FIG. 6B is a diagram illustrating a decentralized block chain network configuration, in accordance with embodiments of the invention; and FIG. 7 illustrates a process flow for control of device identity and usage in a process data network, in accordance with embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

FIG. 1 provides a block diagram illustrating a smart contract block chain system and environment for control of device identity and usage in a process data network 100, in accordance with an embodiment of the invention. As illustrated in FIG. 1, the environment 100 includes a first user 110 and/or a second user 120 where the users represent customers of one or more financial institution(s). A user of the system may be a person, but may also be a business (e.g., a merchant) or any other entity.

The environment 100 also may include a mobile device 200 and a personal computing device 300 for use by the first user 110 and second user 120, respectively. The personal computing device 300 may be any device that employs a processor and memory and can perform computing functions, such as a personal computer or a mobile device. As used herein, a "mobile device" 200 is any mobile communication device, such as a cellular telecommunications device (i.e., a cell phone or mobile phone), personal digital assistant (PDA), a mobile Internet accessing device, or other mobile device.

The mobile device 200 and the personal computing device 300 are configured to communicate over a network 150 with a financial institution system(s) 400 and, in some cases, one or more other financial institution systems 170 and with the blockchain, as represented by the block chain distributed network systems 500. The first user's mobile device 200, the second user's personal computing device 300, the financial institution system(s) 400, the block chain distributed network systems 500, and any other participating financial institution systems 170 are each described in greater detail below with reference to FIGS. 2-5. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network 152.

In general, a mobile device 200 is configured to connect with the network 150 to log the first user 110 into a block chain interface 492 of the financial institution system(s) 400 and/or the block chain distributed network systems 500 (i.e., "block chain systems 500). A user, in order to access the first user's account(s), online banking application and/or mobile banking application on the financial institution system(s) 400 must authenticate with the financial institution system(s) 400 and/or another system. Similarly, in some embodiments, in order to access the distributed ledger(s) of the block chain systems 500, a user must authenticate with the financial institution system(s) 400 and/or another system, such as one of the block chain systems 500. For example, logging into the financial institution system(s) 400 generally requires that the first user 110 authenticate his/her identity using a user name, a passcode, a cookie, a biometric identifier, a private key, a token, and/or another authentication mechanism that is provided by the first user 110 to the financial institution system(s) 400 via the mobile device 200.

The financial institution system(s) 400 are in network communication with other devices, such as other financial institutions' transaction/banking systems 170, block chain systems 500, and a personal computing device 300 that is configured to communicate with the network 150 to log a second user 120 into the financial institution system(s) 400. In one embodiment, the invention may provide an application download server such that software applications that support the financial institution system(s) 400 can be downloaded to the mobile device 200.

In some embodiments of the invention, the application download server is configured to be controlled and managed by one or more third-party data providers (not shown in FIG. 1) over the network 150. In other embodiments, the application download server is configured to be controlled and managed over the network 150 by the same entity or entities that maintains the financial institution system(s) 400.

In some embodiments of the invention, the block chain systems 500 are configured to be controlled and managed by one or more third-party data providers (not shown), financial institutions or other entities over the network 150. In other embodiments, the block chain systems 500 are configured to be controlled and managed over the network 150 by the same entity that maintains the financial institution system(s) 400.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone is merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, mobile televisions, gaming devices, laptop computers, cameras, video recorders, audio/video player, radio, GPS devices, or any combination of the aforementioned.

Some embodiments of the mobile device 200 include a processor 210 communicably coupled to such devices as a memory 220, user output devices 236, user input devices 240, a network interface 260, a power source 215, a clock or other timer 250, a camera 280, and a positioning system device 275. The processor 210, and other processors described herein, generally include circuitry for implementing communication and/or logic functions of the mobile device 200. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks.

The network interface 260 may also include a block chain network interface 270. The block chain network interface 270 may include software, such as encryption software, and hardware, such as a modem, for communicating information to and/or from one or more devices on a network 150 and connected with or that are part of the block chain systems 500. For example, the mobile device may 200 wirelessly communicate encrypted activity information to a terminal of the network 150 or the block chain systems 500.

As described above, the mobile device 200 has a user interface that is, like other user interfaces described herein, made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to receive data from a user such as the first user 110, may include any of a number of devices allowing the mobile device 200 to receive data from a user, such as a keypad, keyboard, touch-screen, touchpad, microphone, mouse, joystick, other pointer device, button, soft key, and/or other input device(s). The user interface may also include a camera 280, such as a digital camera.

The mobile device 200 may also include a positioning system device 275 that is configured to be used by a positioning system to determine a location of the mobile device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the mobile device 200. In other embodiments, the positioning system device 275 includes a proximity sensor or transmitter, such as an RFID tag, that can sense or be sensed by devices known to be located proximate a merchant or other location to determine that the mobile device 200 is located proximate these known devices. Such information may be used by embodiments of the invention in order to demonstrate completion or partial completion of one or more activities associated with a smart contract.

The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices.

The mobile device 200 also includes a memory 220 operatively coupled to the processor 210. As used herein, memory includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which comprise computer-executable instructions/code executed by the processor 210 to implement the functions of the mobile device 200 and/or one or more of the process/method steps described herein. For example, the memory 220 may include such applications as a conventional web browser application 222 and/or a client application 221. These applications also typically provide a graphical user interface (GUI) on the display 230 that allows the first user 110 to communicate with the mobile device 200, the financial institution system(s) 400, and/or other devices or systems. In one embodiment of the invention, when the first user 110 decides to enroll in the device authentication program, the first user 110 downloads or otherwise obtains the client application 221 from the financial institution system(s) 400, from the block chain systems 500 or from a distinct application server. In other embodiments of the invention, the first user 110 interacts with the financial institution system(s) 400 or the block chain systems 500 via the web browser application 222 in addition to, or instead of, the client application 221.

The memory 220 can also store any of a number of pieces of information, and data, used by the mobile device 200 and the applications and devices that make up the mobile device 200 or are in communication with the mobile device 200 to implement the functions of the mobile device 200 and/or the other systems described herein. For example, the memory 220 may include such data as user authentication information, etc.

Referring now to FIG. 3, the personal computing device 300 associated with the second user 120 also includes various features, such as a network communication interface 310, a processing device 320, a user interface 330, and a memory device 350. The network communication interface 310 includes a device that allows the personal computing device 300 to communicate over the network 150 (shown in FIG. 1). In one embodiment of the invention, a network browsing application 355 provides for a user to establish network communication with a financial institution system(s) 400 and/or the block chain systems 500 (shown in FIG. 1) for the purpose of initiating enrollment in the transaction program, interacting with a device authentication program interface, inputting data indicative of actions associated with one or more smart contracts and/or managing device authentication, in accordance with embodiments of the invention.

As used herein, "smart contracts" are computer processes that facilitate, verify and/or enforce negotiation and/or performance of a contract between parties. One fundamental purpose of smart contracts is to integrate the practice of contract law and related business practices with electronic commerce protocols between people on the Internet. Smart contracts may leverage a user interface that provides one or more parties or administrators access, which may be restricted at varying levels for different people, to the terms and logic of the contract. Smart contracts typically include logic that emulates contractual clauses that are partially or fully self-executing and/or self-enforcing. Examples of smart contracts are digital rights management (DRM) used for protecting copyrighted works, financial cryptography schemes for financial contracts, admission control schemes, token bucket algorithms, other quality of service mechanisms for assistance in facilitating network service level agreements, person-to-person network mechanisms for ensuring fair contributions of users, and others.

Smart contract infrastructure can be implemented by replicated resource registries and contract execution using cryptographic hash chains and *Byzantine* fault tolerant replication. For example, each node in a peer-to-peer network or blockchain distributed network may act as a title registry and escrow, thereby executing changes of ownership and implementing sets of predetermined rules that govern transactions on the network. Each node may also check the work of other nodes and in some cases, as noted above, function as miners or validators.

As used herein, "transaction information" may include both monetary and non-monetary transaction information and records. Non-monetary transaction information or records means historical transaction information such as account balances, account activity, misappropriation activity, purchase activity, payment activity and the like and is distinguished from the underlying monetary transactions such as settling of accounts, payments, debits, credits, fund transfers and the like.

As used herein, a "processing device," such as the processing device 320, generally refers to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in a memory. As the phrase is used herein, a processing device 320 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 330 generally includes a plurality of interface devices and/or software that allow a customer to input commands and data to direct the processing device to execute instructions. For example, the user interface 330 presented in FIG. 3 may include a graphical user interface (GUI) or an interface to input computer-executable instructions that direct the processing device 320 to carry out specific functions. The user interface 330 employs certain input and output devices to input data received from the first user 110 or second user 120 or output data to the first user 110 or second user 120. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device" 350 generally refers to a device or combination of devices that store one or more forms of computer-readable media for storing data and/or computer-executable program code/instructions. Computer-readable media is defined in greater detail below. For example, in one embodiment, the memory device 350 includes any computer memory that provides an actual or virtual space to temporarily or permanently store data and/or commands provided to the processing device 320 when it carries out its functions described herein.

FIG. 4 provides a block diagram illustrating the financial institution system(s) 400, in greater detail, in accordance with embodiments of the invention. As illustrated in FIG. 4, in one embodiment of the invention, the financial institution system(s) 400 include one or more processing devices 420 operatively coupled to a network communication interface 410 and a memory device 450. In certain embodiments, the financial institution system(s) 400 are operated by a first entity, such as a financial institution, while in other embodiments, the financial institution system(s) 400 are operated by an entity other than a financial institution.

It should be understood that the memory device 450 may include one or more databases or other data structures/repositories. The memory device 450 also includes computer-executable program code that instructs the processing device 420 to operate the network communication interface 410 to perform certain communication functions of the financial institution system(s) 400 described herein. For example, in one embodiment of the financial institution system(s) 400, the memory device 450 includes, but is not limited to, a network server application 470, an authentication application 460, a customer account data repository 480 which includes customer authentication data 480 and customer account information 484, a mobile banking application 490 which includes a block chain interface 492, a mobile web server application 493, a downloadable transaction application 494 and other computer-executable instructions or other data. The computer-executable program code of the network server application 470, the authentication application 460, or the mobile banking application 490 may instruct the processing device 420 to perform certain logic, data-processing, and data-storing functions of the financial institution system(s) 400 described herein, as well as communication functions of the financial institution system(s) 400.

In one embodiment, the customer account data repository 480 includes customer authentication data 482 and customer account information 484. The network server application 470, the authentication application 460, and the mobile banking application 490 are configured to invoke or use the customer account information 484, the customer authentication data 482, and the block chain interface 492 when authenticating a user to the financial institution system(s) 400 and/or the block chain systems 500.

As used herein, a "communication interface" generally includes a modem, server, transceiver, and/or other device for communicating with other devices on a network, and/or a user interface for communicating with one or more customers. Referring again to FIG. 4, the network communication interface 410 is a communication interface having one or more communication devices configured to communicate with one or more other devices on the network 450, such as the mobile device 200, the personal computing device 300, the other financial institution banking systems 170, and the block chain systems 500. The processing device 420 is configured to use the network communication interface 410 to transmit and/or receive data and/or commands to and/or from the other devices connected to the network 150.

FIG. 5 provides a block diagram illustrating block chain network systems 500, in accordance with embodiments of the invention. As discussed with reference to FIG. 6B below, embodiments of the block chain may include multiple systems, servers, computers or the like maintained by one or many entities. FIG. 5 merely illustrates one of those systems that, typically, interacts with many other similar systems to form the block chain. In one embodiment of the invention, the block chain network systems 500 are operated by a second entity that is a different or separate entity from the first entity (e.g., the financial institution) that, in one embodiment of the invention, implements the financial institution system(s) 400. In some embodiments, the financial institution system(s) 400 are part of the block chain. Similarly, in some embodiments, the block chain network systems 500 are part of the financial institution system(s) 400. In other embodiments, the financial institution system(s) 400 are distinct from the block chain network systems 500.

As illustrated in FIG. 5, the one of the block chain network systems 500 generally includes, but is not limited to, a network communication interface 510, a processing device 520, and a memory device 550. The processing device 520 is operatively coupled to the network communication interface 510 and the memory device 550. In one embodiment of the block chain network systems 500, the memory device 550 stores, but is not limited to, a transaction program interface 560 and a distributed ledger 570. In some embodiments, the distributed ledger 570 stores data including, but not limited to, smart contract logic and rules, such as a first smart contract, its associated logic and rules, a second smart contract, its associated logic and rules, a third smart contract, its associated logic and rules, etc. In one embodiment of the invention, both the transaction program interface 560 and the distributed ledger 570 may associate with applications having computer-executable program code that instructs the processing device 520 to operate the network communication interface 510 to perform certain communication functions involving the distributed ledger 570 described herein. In one embodiment, the computer-executable program code of an application associated with the distributed ledger 570 may also instruct the processing device 520 to perform certain logic, data processing, and data storing functions of the application associated with the distributed ledger 570 described herein.

The network communication interface 510 is a communication interface having one or more communication devices configured to communicate with one or more other devices on the network 150. The processing device 520 is configured to use the network communication interface 510 to receive information from and/or provide information and commands to a mobile device 200, a personal computing device 300, other financial institution systems 170, other block chain network systems 500, the financial institution system(s) 400 and/or other devices via the network 150. In some embodiments, the processing device 520 also uses the network communication interface 510 to access other devices on the network 150, such as one or more web servers of one or more third-party data providers. In some embodiments, one or more of the devices described herein may be operated by a second entity so that the second entity controls the various functions involving the block chain network systems 500. For example, in one embodiment of the invention, although the financial institution system(s) 400 are operated by a first entity (e.g., a financial institution), a second entity operates one or more of the block chain network systems 500 that store various copies of the distributed ledger 570.

As described above, the processing device 520 is configured to use the network communication interface 510 to gather data, such as data corresponding to transactions, blocks or other updates to the distributed ledger 570 from various data sources such as other block chain network systems 500. The processing device 520 stores the data that it receives in its copy of the distributed ledger 570 stored in the memory device 550.

As discussed above, in some embodiments of the invention, an application server or application download server (not shown) might be provided. The application download server may include a network communication interface, a processing device, and a memory device. The network communication interface and processing device are similar to the previously described network communication interface 410 and the processing device 420 previously described. For example, the processing device is operatively coupled to the network communication interface and the memory device. In one embodiment of the application download server, the memory device includes a network browsing application having computer-executable program code that instructs the processing device to operate the network communication interface to perform certain communication functions of the application download server described herein. In some embodiments of the invention, the application download server provides applications that are to be downloaded to a qualified user's mobile device or personal computing device.

Rather than utilizing a centralized database of aliases as discussed with reference to some embodiments above and as shown in FIG. 6A, other various embodiments of the invention may use a decentralized block chain configuration or architecture as shown in FIG. 6B in order to facilitate a transaction management program using smart contracts distributed on a block chain distributed network. Such a decentralized block chain configuration ensures accurate mapping of smart contracts to financial institutions and/or customers. Accordingly, a block chain configuration may be used to maintain an accurate ledger of smart contract and/or transaction records and to provide validation of transactions involving those smart contracts.

A block chain or blockchain is a distributed database that maintains a list of data records, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies such as used in bitcoin. The data records recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger. Similarly, when multiple versions of a document or transaction exits on the ledger, multiple nodes can converge on the most up-to-date version of the transaction. For example, in the case of a virtual currency transaction, any node within the block chain that creates a transaction can determine within a level of certainty whether the transaction can take place and become final by confirming that no conflicting transactions (i.e., the same currency unit has not already been spent) confirmed by the block chain elsewhere.

The block chain typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person), and blocks are created by users known as "miners" who use specialized software/equipment to create blocks. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases, that meets other criteria.

As mentioned above and referring to FIG. 6B, a block chain 600 is typically decentralized—meaning that a distributed ledger 620 (i.e., a decentralized ledger) is maintained on multiple nodes 610 of the block chain 600. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains.

Various other specific-purpose implementations of block chains have been developed. These include distributed domain name management, decentralized crowd-funding, synchronous/asynchronous communication, decentralized real-time ride sharing and even a general purpose deployment of decentralized applications. In some embodiments, a block chain may be characterized as a public block chain, a consortium block chain, or a private block chain. In this regard, the public block chain is a block chain that anyone in the world can read, anyone in the world can send transactions to and expect to see them included if they are valid, and anyone in the world can participate in the consensus process. The consensus process is a process for determining what blocks get added to the chain and what the current state the block is. Typically, public block chains are secured by crypto economics—the combination of economic motivations and cryptographic verification using mechanisms such as proof of work, following a general principle that the degree to which someone can have an influence in the consensus process is proportional to the quantity of economic resources that they can bring to bear. A public block chain is generally considered to be fully decentralized.

In some embodiments, a consortium block chain is a block chain where the consensus process is controlled by a pre-selected set of nodes; for example, a block chain may be associated with a number of member institutions (say 15), each of which operate in such a way that the at least 10 members must sign every block in order for the block to be valid. The right to read such a block chain may be public, or restricted to the participants. These block chains may be considered partially decentralized.

In still other embodiments, fully private block chains is a block chain whereby permissions are kept centralized with one entity. The permissions may be public or restricted to an arbitrary extent.

Mobile device is a rapidly replacing personal computers at home and in the workplace. Smart phones and tablets are being extensively used for a variety of purposes ranging from web surfing to e-commerce transactions to online banking. Financial institutions are beginning to recognize the advantages of the mobile Internet age to overcome the challenges of closer engagement with customers and cost reduction. This has resulted in a switching focus towards banking services using mobile devices such as smart phones and tablets, and a variety of smartphone apps.

Financial institutions have implemented payment services such as mobile payment, also referred to as mobile money, mobile money transfer, and mobile wallet that operate under financial regulation and are performed via a mobile device. Instead of paying with cash, check, or credit cards, the user can use the mobile device to pay for a wide range of services and digital or hard goods. Of the various models used in mobile payment, Near Field Communication (NFC) is used mostly in paying for purchases made in physical stores or transportation services. A user using a special mobile phone equipped with the smartcard may waive his/her phone near a reader module to execute the transaction after which a payment could be deducted from an associated financial institution account directly. Typically, such a transaction model requires that the mobile device store at least some information associated with the user's financial institution accounts to facilitate NFC based transactions. Or in cases where the financial information is stored in a cloud-based environment, axis information associated with the user's cloud account is stored on the mobile device. Since most financial transactions executed using this model require only the financial information associated with the user to successfully execute a transaction, there is exposure involved in the misappropriation of the financial information. In this regard, financial information associated with the user may be wirelessly sniped and used in misappropriate transactions. The present invention provides the functional benefit of using a block chain configuration to determine device identity associated with the mobile device of the user that is typically used in the execution of financial transactions.

FIG. 7 illustrates a process flow for control of device identity and usage 700, in accordance with an embodiment of the invention. As shown in block 702, the process flow includes receiving an indication that the user has executed a transaction using a mobile device. Exemplary transactions include, but are not limited to: purchasing, renting, selling, and/or leasing one or more goods and/or services (e.g., merchandise, groceries, tickets, and the like); withdrawing cash; making deposits; making payments to creditors (e.g., paying bills, paying taxes, and the like); sending remittances; transferring funds; loading money onto stored value cards; and/or the like. In addition, the transaction information can be any information that identifies, defines, describes, and/or is otherwise associated with the transaction. Exemplary transaction information includes, but is not limited to, the party(ies) involved in the transaction, the date and/or time of the transaction, the account(s) involved in the transaction, the transaction amount(s) associated with the transaction, the good(s) and/or service(s) involved in the transaction, a description of the transaction (which, itself, can include any transaction information, e.g., the description may describe the transaction status, the goods and/or services involved in the transaction, and the like), and/or the like.

In some embodiments, the user may register his/her credit and debit cards into a secure wallet on the mobile device to enable the mobile device to be used in executed transaction. This wallet may be stored in the cloud, on the device or book. The user may then pay for products/services associated with a merchant by using the mobile device near the payment terminal. In some embodiments, the user may execute online purchases by authenticating themselves on the mobile device to the online mobile payment system. Typically, the point of sale terminal of the merchant must have a payment terminal that supports the required model of mobile device transaction (e,g., Near Field Communication). In this regard, NFC chips are built into the mobile device and allow communication with the point of sale terminal when the mobile device is proximate to the NFC-enabled point of sale terminal. In some embodiments, using the mobile device to execute the transaction may require one or more authentication credentials associated with the user to be verified for use in the execution of transactions. For example, the user may have to use a fingerprint or a Personal Identification Number (PIN) to authorize the transaction. In some other embodiments, using the mobile device to execute the transaction may not require any further authentication credentials beyond the credentials required from the user to access the mobile device.

Next, as shown in block 704, the process flow includes retrieving financial credentials associated with the user from the mobile device. In some embodiments, the financial credentials may include but is not limited to one or more debit or credit cards associated with one or more financial institution accounts of the user. In some other embodiments, the financial credentials may include a token (e.g., an alias, substitute, surrogate, or other like identifier) as a replacement for sensitive account information. Typically, tokens or portions of tokens may be used as a stand in for a user account number, user name, pin number, routing information related to the financial institution associated with the account, security code, or other like information relating to the user account. The tokens may then be utilized as a payment instrument to complete a transaction. In yet another embodiment, the payment credentials may include any other information that may be used to access funds from one or more financial institution accounts of the user, for example, a debit card, credit card, checkcard, ATM card, paper check, electronic check, wire transfer, cash, online bill pay, automated clearing house (ACH), wireless and/or contactless payment, and/or the like.

In accordance with some embodiments, the system can be configured to receive the transaction information directly or indirectly from the source of the transaction. For example, in some embodiments, where the transaction involves a transaction machine (e.g., ATM, POS device, personal computer, and the like), the apparatus is located remotely from the transaction machine but is operatively connected to the transaction machine via a network. As another example, in some embodiments, where the transaction involves a transaction machine, the apparatus may include the transaction machine. For example, where the transaction involves a cash withdrawal at an ATM, the system may be embodied as the ATM.

Further, the system can be configured to receive the transaction information in any way. For example, in some embodiments, the apparatus is configured to receive an authorization request associated with the transaction. In some embodiments, the apparatus is provided, serviced, operated, controlled, managed, and/or maintained (collectively referred to herein as "maintained" for simplicity) by a financial institution, and the apparatus is configured to approve and/or decline authorization requests for debit transactions, ATM transactions, POS device transactions, and/or one or more other types of transactions that involve one or more accounts maintained by the financial institution. As another example, in some embodiments, the process flow includes a transaction machine (e.g., POS device, ATM, and the like) configured to initiate, perform, complete, and/or otherwise facilitate one or more transactions, and thus receives transaction information when the transaction machine is used to conduct a transaction. As still another example, in some embodiments, the process flow includes a batch processing apparatus configured to receive the transaction information by receiving a batch job having that transaction information stored therein.

Next, as shown in block 706, the process flow includes retrieving device information associated with the mobile device used in the execution of the transaction. Typically, device information includes one or more mobile device identifiers which can be used to identify a mobile device and associate the mobile device with the user. In one aspect, the device information includes a unique identification number associated with a smart phone or similar handheld device and are separate from hardware serial numbers. Typically, the unique identification number should remain constant for the lifetime of the device unless otherwise changed manually by the user. In another aspect, the device information includes hardware serial number specific to the mobile device. Typically, the hardware serial number does not change for the lifetime of the device. The block chain can place device information onto a block chain "close-loop" such that authorized members may access the device information of the user.

In some embodiments, the device information may include activity information associated with the user. Typically, activity information includes any information associated with an action performed by the user on the mobile device. For example, activities include but are not limited to accessing email, text messaging, Internet browsing, application access, or the like. In this way, the system may track and manage information associated with these activities performed by the user on the mobile device and place each activity information onto a block chain. For example, the system may be configured to track frequent email recipients, social media activity, popular websites accessed, frequent applications accessed, or the like. In doing so, the present invention provides the functional benefit of establishing a "ledger" of information associated with user activity on the mobile device.

In some embodiments, the activity information and the device information may be synchronized to determine user activity on a specific mobile device that is used to execute financial transactions. In this regard, the system may be configured to track multiple mobile devices associated with the user and activity information associated with each of those mobile devices and place them in either individual block chains or a common block chain. For example, the user may utilize a smart phone to execute transactions at a point of sale terminal associated with a merchant and a tablet at home to execute online transactions with various merchants online. In this case, the system may identify device information associated with both the tablet and the smart phone associated with the user and track and manage activity information in both the tablet and the smart phone independently.

Next, as shown in block 708, the process flow includes determining whether the retrieved financial credentials and the device information meet a condition of the block chain. The user may configure his/her mobile device to be used in view of a payment instrument to conduct financial transactions. In this regard, the user may transmit a request to the financial institution in which the user has one or more financial institution accounts. This request may include an indication that the user wishes to enable the mobile device to be used as a financial payment instrument. In response, the financial institution may initiate a presentation of a user interface for display on the mobile device of the user, the user interface including one or more financial institution accounts of the user. The user may then select at least one of the one or more financial institution accounts that the user wishes to access via his/her mobile device such that when the user executes a transaction at a point of sale terminal of the merchant, funds from the selected financial institution accounts may be debited to be paid two words the executed transaction. Next, the financial institution may enable the user to execute transactions using the mobile device by providing financial credentials to be stored on the mobile device. In this way, with the user approaches the point of sale of the merchant, the user may utilize the Near Field Communication (NFC) capabilities of the mobile device to transmit the financial credentials to the point of sale terminal (also equipped with NFC capabilities) to execute the transaction.

In some embodiments, in response to the user's request to use the mobile device as a payment instrument and providing the user with the financial credentials, the system may be configured to determine device information associated with the mobile device in which the financial credentials are to be stored. In this way, a device record may be created and maintained by the financial institution. Recent advances in mobile device technology has enabled users to periodically upgrade their mobile device. However, the financial credentials required to enable the user to utilize a mobile device remains constant regardless of the version, make, or model of the mobile device used. In such cases, there is an inherent possibility of exposure as the financial credentials misappropriated from the mobile device of the user may be used to execute malfeasant transactions. The present invention provides the functional benefit of synchronizing the device information and the financial credentials and creating a device record for each mobile device used to execute transactions using the financial credentials. Each device record created is stored in the distributed ledger that is updated based on the most current mobile device having the financial credentials stored thereon. In this way, each time the user upgrades his/her mobile device, the system may be configured to create a device record reflecting the most current mobile device used to execute a financial transaction.

In some embodiments, the user may execute transactions using one or more financial institution accounts associated with one or more financial institutions using the same mobile device. In such cases, the block chain of device records may be managed by a third party different from the financial institutions associated with the user. In this way, member institutions may be provided access to the block chain for verification and validation of the transaction executed by the user using the mobile device. The financial institution that the user initially accesses as the access point to the block chain network is considered the "host institution" and the systems of the host institution may be referred to as "host systems". A "source institution" is a financial institution other than the host institution that has device records of a user and the systems of the source institution may be referred to as "source systems". Financial institutions may function as both source institutions and host institutions depending on whether the financial institution is the access point selected by the user. In some embodiments, the user may execute a transaction using the mobile device by selecting one or more financial credentials associated with a member institution. When the member institution receives an indication that the user has executed a transaction using the mobile device and financial credentials associated with the member institution, the member institution may assess the block chain to determine whether the device record associated with the mobile device meets the condition of the block chain.

When a transaction is executed by the user, the financial institution accesses the distributed ledger and determines whether the device record associated with the mobile device used in the execution of the transaction meets one or more conditions. This may be considered to validate the transaction. The device record may include an authentication key or signature that is recognized by member institutions as being part of the block chain. The device record on the distributed ledger may be accessed by each financial institution that is a member of the block chain. The member institutions of the block chain may have a complete or partial copy of the entire ledger or set of device records and/or blocks on the block chain. Each device record is validated based on logic/rules of a smart contract associated with the financial institution or entered into an agreed-upon by member institutions.

Next, as shown in block 710, the process flow includes receiving an indication that the retrieved financial credentials and the device information meet the condition of the block chain thereby validating the request. In some embodiments, the validation step may be performed by the source institution prior to adding the device record to the block chain based on the logic and rules from the source institution's distributed ledger. The source institution posts the validated device record to the block chain with an authentication key or signature that is recognized by other members of the block chain. The validation may also be performed by one or more of the member financial institutions other than the source institution. For example, in a block chain certain institutions may be designated as validation institutions that in addition to being potential source and/or host institutions operate as validation institutions for all members of the block chain. In such an arrangement the device record of the source institution (i.e. the financial institution through which the transaction was originally made with the user) is first sent by the source institution to the validation institution and the request is validated using information provided with the request to the validation institution based on the logic and rules from the block chain's distributed ledger. The validated device record may then be posted to the block chain by the validation institution with a signature or authentication key indicating that the transaction is validated. In other embodiments, the device record is first sent by the source institution to the validation institution, and the request is validated based on information provided with the device record at the validation institution. The validation institution may transmit the signature or authentication key to the source institution, and the source institution may post the validated device record to the block chain. In some embodiments the validation institutions may comprise an entity that is not a member financial institution and that does not function as a host or source institution. In such an embodiment the validation institution does not access, maintain or control any user device records and only functions to validate the device record. Once the device record is validated the validation institutions may provide an authentication key or signature to the source institution that is used by the source institution to post the validated device record to the block chain.

In various embodiments, the block chain may be configured with a set of rules to dictate when and how transactions are validated and other details about how the network communicates data and the like. In some embodiments, the rules dictate that a source institution must validate all device records. In some embodiments, the rules dictate that some or all device records may be approved by one or more validation institutions. A validation institution may be one or more of the financial institutions on the block chain that validate transactions for other financial institutions on the block chain. In some such cases, the rules dictate that the device record created by a source institution, also includes additional information that is useful in determining whether requests associated with the device record should be approved. In other embodiments, the validation institution must reach out to the host institution in certain situations as dictated by the rules. In some embodiments, more than one institution must validate a transaction and/or mobile device before it may be posted to the block chain as a validated device record.

Next, as shown in block 712, the process flow includes allowing the execution of the transaction to be completed based on at least receiving the indication that the retrieved financial credentials and the device information meet the condition of the block chain.

In some embodiments, the user may access the device records of all financial institutions that are members of the block chain by logging in at a single access point. Typically, the access point will be through a computing device such as mobile device or personal computing device as previously described where the user utilizes a user interface application of one of the user's financial institutions. The user may be required to authenticate him/herself using a login process requiring a password or other identity verification at the host institution, as previously described. Once the user is verified the user may request access to the user's device records. In the system of the invention the user may access not only the device records of the host financial institution but also the records of any source institution that is a member of the block chain.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 6823US1.014033.2555 | 14/942,326 now published as 2017/0140408 | TRANSPARENT SELF-MANAGING REWARDS PROGRAM USING BLOCKCHAIN AND SMART CONTRACTS | Nov. 16, 2015 |
| 6908US1.014033.2652 | 15/041,555 now published as 2017/0132630 | BLOCK CHAIN ALIAS FOR PERSON-TO-PERSON PAYMENTS | Feb. 11, 2016 |
| 6908USP1.014033.2556 | 62/253,935 | BLOCK CHAIN ALIAS PERSON-TO-PERSON PAYMENT | Nov. 11, 2015 |
| 6985US1.014033.2605 | 15/041,566 now published as 2017/0132615 | BLOCK CHAIN ALIAS PERSON-TO-PERSON PAYMENTS | Feb. 11, 2016 |
| 6988US1.014033.2607 | 15/050,375 now U.S. Patent No. 10,135,870 | SYSTEM FOR CONVERSION OF AN INSTRUMENT FROM A NON-SECURED INSTRUMENT TO A SECURED INSTRUMENT IN A PROCESS DATA NETWORK | Concurrently Herewith |
| 6989US1.014033.2608 | 15/050,379 now published as 2017/0243215 | SYSTEM FOR EXTERNAL SECURE ACCESS TO PROCESS DATA NETWORK | Concurrently Herewith |
| 6990US1.014033.2609 | 15/050,358 now U.S. Patent No. 10,178,105 | SYSTEM FOR PROVIDING LEVELS OF SECURITY ACCESS TO A PROCESS DATA NETWORK | Concurrently Herewith |
| 6991USP1.014033.2610 | 62/293,585 | SYSTEM FOR SECURE ROUTING OF DATA TO VARIOUS NETWORKS FROM A PROCESS DATA NETWORK | Feb. 10, 2016 |
| 6992USP1.014033.2611 | 62/293,620 | SYSTEM FOR CENTRALIZED CONTROL OF SECURE ACCESS TO PROCESS DATA NETWORK | Feb. 10, 2016 |
| 6993US1.014033.2612 | 15/049,605 now U.S. Patent No. 10,129,238 | SYSTEM FOR CONTROL OF SECURE ACCESS AND COMMUNICATION WITH DIFFERENT PROCESS DATA NETWORKS WITH SEPARATE SECURITY FEATURES | Concurrently Herewith |
| 6996US1.014033.2615 | 15/049,777 now U.S. Patent No. 10,142,312 | SYSTEM FOR ESTABLISHING SECURE ACCESS FOR USERS IN A PROCESS DATA NETWORK | Concurrently Herewith |
| 6997US1.014033.2616 | 15/049,835 now U.S. Patent No. 10,026,118 | SYSTEM FOR ALLOWING EXTERNAL VALIDATION OF DATA IN A PROCESS DATA NETWORK | Concurrently Herewith |
| 6998US1.014033.2719 | 15/050,094 now published as 2017/0214699 | SYSTEM FOR CONVERSION OF AN INSTRUMENT FROM A NON-SECURED INSTRUMENT TO A SECURED INSTRUMENT IN A PROCESS DATA NETWORK | Concurrently Herewith |
| 6998USP1.014033.2617 | 62/287,293 | SYSTEM FOR CONVERSION OF AN INSTRUMENT FROM A NON-SECURED INSTRUMENT TO A SECURED | Jan. 26, 2016 |

-continued

| Docket Number | U.S. patent application Ser. No. | Title | Filed On |
|---|---|---|---|
| | | INSTRUMENT IN A PROCESS DATA NETWORK | |
| 6999US1.014033.2720 | 15/050,098 now published as 2017/0213221 | SYSTEM FOR TRACKING AND VALIDATION OF MULTIPLE INSTANCES OF AN ENTITY IN A PROCESS DATA NETWORK | Concurrently Herewith |
| 6999USP1.014033.2618 | 62/287,301 | SYSTEM FOR TRACKING AND VALIDATION OF MULTIPLE INSTANCES OF AN ENTITY IN A PROCESS DATA NETWORK | Jan. 26, 2016 |
| 7000US1.014033.2721 | 15/050,084 now U.S. Patent No. 9,825,931 | SYSTEM FOR TRACKING AND VALIDATION OF AN ENTITY IN A PROCESS DATA NETWORK | Concurrently Herewith |
| 7000USP1.014033.2619 | 62/287,298 | SYSTEM FOR TRACKING AND VALIDATION OF AN ENTITY IN A PROCESS DATA NETWORK | Jan. 26, 2016 |
| 7001US1.014033.2620 | 15/050,372 now published as 2017/0243217 | SYSTEM FOR ROUTING OF PROCESS AUTHORIZATIONS AND SETTLEMENT TO A USER IN A PROCESS DATA NETWORK | Concurrently Herewith |
| 7002US1.014033.2621 | 15/050,285 now published as 2017/0243177 | SYSTEM FOR ROUTING OF PROCESS AUTHORIZATION AND SETTLEMENT TO A USER IN PROCESS DATA NETWORK BASED ON SPECIFIED PARAMETERS | Concurrently Herewith |
| 7003US1.014033.2622 | 15/050,292 now published as 2017/0243209 | SYSTEM FOR GRANT OF USER ACCESS AND DATA USAGE IN A PROCESS DATA NETWORK | Concurrently Herewith |
| 7033US1.014033.2638 | 15/050,294 now published as 2017/0243212 | SYSTEM FOR IMPLEMENTING A DISTRIBUTED LEDGER ACROSS MULTIPLE NETWORK NODES | Concurrently Herewith |
| 7038US1.014033.2643 | 15/049,865 now published as 2017/0244720 | SYSTEM FOR EXTERNAL VALIDATION OF PRIVATE-TO-PUBLIC TRANSITION PROTOCOLS | Concurrently Herewith |
| 7039US1.014033.2644 | 15/049,852 now published as 2017/0243025 | SYSTEM FOR EXTERNAL VALIDATION OF DISTRIBUTED RESOURCE STATUS | Concurrently Herewith |
| 7040US1.014033.2645 | 15/050,316 now published as 2017/0243214 | SYSTEM FOR TRACKING TRANSFER OF RESOURCES IN A PROCESS DATA NETWORK | Concurrently Herewith |
| 7041US1.014033.2651 | 15/050,321 now published as 2017/0243287 | SYSTEM FOR MANAGING SERIALIZABILITY OF RESOURCE TRANSFERS IN A | Concurrently Herewith |

-continued

| Docket Number | U.S. patent application Ser. No. | Title | Filed On |
| --- | --- | --- | --- |
| 7042US1.014033.2640 | 15/050,307 now published as 2017/0243213 | PROCESS DATA NETWORK SYSTEM TO ENABLE CONTACTLESS ACCESS TO A TRANSACTION TERMINAL USING A PROCESS DATA NETWORK | Concurrently Herewith |

What is claimed is:

1. A system operatively connected with a block chain distributed network and for using the block chain distributed network for control of device identity and usage in a process data network, the system comprising:
a memory device storing logic and rules for the block chain; and
a processing device operatively coupled to the memory device, wherein the processing device is configured to execute computer-readable program code to:
receive an indication that a user has executed a transaction using a mobile device with a third source institution, wherein the mobile device comprises one or more financial credentials registered to a secure electronic wallet stored thereon, wherein the one or more financial credentials is associated with a financial information;
retrieve information associated with the transaction executed by the user using the mobile device, wherein the information comprises at least the one or more financial credentials used to execute the transaction;
retrieve, from the mobile device, device information comprising a unique identification number, wherein the device information comprises activity information associated with the user, wherein the activity information comprises information associated with one or more actions performed by the user on the mobile device;
generate a device record based on at least synchronizing the device information and the one or more financial credentials;
determine whether the device record used in the execution of the transaction meets a condition of the block chain distributed ledger, wherein the block chain distributed ledger comprises one or more device records and past transactions executed by the user using the one or more device records with one or more financial institutions, wherein the past transactions comprise at least information associated with the transactions executed by the user with a first source institution and a second source institution, wherein the condition of the block chain distributed ledger comprises at least one or more logic/rules associated with a smart contract associated with the financial institution;
analyze the block chain distributed ledger to determine a pattern associated with the past transactions executed by an entity stored in the block chain distributed ledger;
compare the information associated with the transaction with the pattern associated with the past transactions to determine a match; and
determine that the device record used in the execution of the transaction meets the condition of the block chain distributed ledger;
determine a match between the information associated with the transaction and the pattern associated with the past transactions stored in the block chain distributed ledger;
authorize the execution of the transaction based on at least determining that the device record used in the execution of the transaction meets the condition of the block chain distributed ledger, and determining the match between the information associated with the transaction and the pattern associated with the past transactions stored in the block chain distributed ledger;
transmit a notification to one or more validation nodes to validate the device record based on at least the logic/rules of the smart contract associated with the financial institution;
receive an input from the one or more validating nodes validating the device record; and
post the device record to the block chain with a signature and an authentication key indicating that the mobile device is validated based on at least determining that the device record used in the execution of the transaction meets the condition of the block chain distributed ledger.

2. The system of claim 1, wherein the processing device is configured to execute computer-readable program code further to:
receive a request from a user to enable the mobile device to be used as a payment instrument for conducting a transaction;
initiate a presentation of a user interface for display on the mobile device of the user, wherein the user interface comprises one or more financial institution accounts associated with the user;
receive, via the user interface, a user selection of at least one of the one or more financial institution accounts, wherein the user selection indicates that funds from the selected financial institution accounts be used in any transaction executed by the user using the mobile device; and
receive, via the user interface, one or more financial credentials associated with the selected financial institution accounts to be stored on the mobile device.

3. The system of claim 1, wherein the processing device is configured to execute computer-readable program code further to:
receive a request from the financial institution to access the block chain;
determine that a financial institution associated with the financial credentials is a member institution;

enable the financial institution to access the block chain;
receive a request from the financial institution to post the device record to the block chain; and
post the device record to the block chain.

4. The system of claim 3, wherein the processing device is configured to execute computer-readable program code further to:
enable the financial institution to validate the device identity prior to adding the device record to the block chain.

5. The system of claim 3, wherein the processing device is configured to execute computer-readable program code further to:
receive one or more authentication credentials from the financial institution to enable the financial institution to access the block chain;
validate the one or more authentication credentials; and
enable the financial institution to access the block chain in response to validating the one or more authentication credentials.

6. The system of claim 1, wherein the processing device is configured to execute computer-readable program code further to:
establish a communication link with the mobile device, wherein establishing further comprises creating a wireless data channel with the mobile device;
initiate, via the established communication link, a presentation of a user interface, the user interface comprising one or more mobile devices used by the user to execute the transaction;
receive, via the established communication link, a user selection of a mobile device indicating that the selected mobile device is the most current mobile device being used to execute transactions;
retrieve device information associated with the selected mobile device; and
update the block chain with the device information associated with the selected mobile device.

7. The system of claim 6, wherein the processing device is configured to execute computer-readable program code further to:
receive, via the established communication link, an input from the user to add information associated with a new mobile device indicating that the new mobile device replace an existing mobile device being used to execute a transaction;
retrieve, via the established communication link, device information associated with the new mobile device;
update the block chain with the device information associated with the new mobile device.

8. A computerized method for using the block chain distributed network for control of device identity and usage in a process data network, the method comprising:
receiving an indication that a user has executed a transaction using a mobile device with a third source institution, wherein the mobile device comprises one or more financial credentials registered to a secure electronic wallet stored thereon, wherein the one or more financial credentials is associated with a financial information;
retrieving information associated with the transaction executed by the user using the mobile device, wherein the information comprises at least the one or more financial credentials used to execute the transaction;
retrieving, from the mobile device, device information comprising a unique identification number, wherein the device information comprises activity information associated with the user, wherein the activity information comprises information associated with one or more actions performed by the user on the mobile device;
generating a device record based on at least synchronizing the device information and the one or more financial credentials;
determining whether the device record used in the execution of the transaction meets a condition of the block chain distributed ledger, wherein the block chain distributed ledger comprises one or more device records and past transactions executed by the user using the one or more device records with one or more financial institutions, wherein the past transactions comprise at least information associated with the transactions executed by the user with a first source institution and a second source institution, wherein the condition of the block chain distributed ledger comprises at least one or more logic/rules associated with a smart contract associated with the financial institution;
analyzing the block chain distributed ledger to determine a pattern associated with the past transactions executed by an entity stored in the block chain distributed ledger;
comparing the information associated with the transaction with the pattern associated with the past transactions to determine a match; and
determining that the device record used in the execution of the transaction meets the condition of the block chain distributed ledger;
determining a match between the information associated with the transaction and the pattern associated with the past transactions stored in the block chain distributed ledger; and
authorizing the execution of the transaction based on at least determining that the device record used in the execution of the transaction meets the condition of the block chain distributed ledger, and determining the match between the information associated with the transaction and the pattern associated with the past transactions stored in the block chain distributed ledger;
transmitting a notification to one or more validation nodes to validate the device record based on at least the logic/rules of the smart contract associated with the financial institution;
receiving an input from the one or more validating nodes validating the device record; and
posting the device record to the block chain with a signature and an authentication key indicating that the mobile device is validated based on at least determining that the device record used in the execution of the transaction meets the condition of the block chain distributed ledger.

9. The method of claim 8, wherein the method further comprises:
receiving a request from a user to enable the mobile device to be used as a payment instrument for conducting a transaction;
initiating a presentation of a user interface for display on the mobile device of the user, wherein the user interface comprises one or more financial institution accounts associated with the user;
receiving, via the user interface, a user selection of at least one of the one or more financial institution accounts, wherein the user selection indicates that funds from the selected financial institution accounts be used in any transaction executed by the user using the mobile device; and receiving, via the user interface, one or more financial credentials associated with the selected financial institution accounts to be stored on the mobile device.

10. The method of claim 8, wherein the method further comprises:
receiving a request from the financial institution to access the block chain;
determining that a financial institution associated with the financial credentials is a member institution;
enabling the financial institution to access the block chain;
receiving a request from the financial institution to post the device record to the block chain; and
posting the device record to the block chain.

11. The method of claim 10, wherein the method further comprises:
enabling the financial institution to validate the device identity prior to adding the device record to the block chain.

12. The method of claim 10, wherein the method further comprises:
receiving one or more authentication credentials from the financial institution to enable the financial institution to access the block chain;
validating the one or more authentication credentials; and
enabling the financial institution to access the block chain in response to validating the one or more authentication credentials.

13. The method of claim 8, wherein the method further comprises:
establishing a communication link with the mobile device, wherein establishing further comprises creating a wireless data channel with the mobile device;
initiating, via the established communication link, a presentation of a user interface, the user interface comprising one or more mobile devices used by the user to execute the transaction;
receiving, via the established communication link, a user selection of a mobile device indicating that the selected mobile device is the most current mobile device being used to execute transactions;
retrieving device information associated with the selected mobile device; and
updating the block chain with the device information associated with the selected mobile device.

14. The method of claim 13, wherein the method further comprises:
receiving, via the established communication link, an input from the user to add information associated with a new mobile device indicating that the new mobile device replace an existing mobile device being used to execute a transaction;
retrieving, via the established communication link, device information associated with the new mobile device;
updating the block chain with the device information associated with the new mobile device.

15. A computer program product for execution on a system operatively connected with the block chain distributed network, the computer program product for using the block chain distributed network for control of device identity and usage in a process data network, the computer program product comprising at least one non-transitory computer-readable medium having computer-readable program code portions embodied therein, the computer-readable program code portions comprising:
an executable portion configured to receive an indication that a user has executed a transaction using a mobile device with a third source institution, wherein the mobile device comprises one or more financial credentials registered to a secure electronic wallet stored thereon, wherein the one or more financial credentials is associated with a financial information;
an executable portion configured to retrieve information associated with the transaction executed by the user using the mobile device, wherein the information comprises at least the one or more financial credentials used to execute the transaction;
an executable portion configured to retrieve, from the mobile device, device information comprising a unique identification number, wherein the device information comprises activity information associated with the user, wherein the activity information comprises information associated with one or more actions performed by the user on the mobile device;
an executable portion configured to generate a device record based on at least synchronizing the device information and the one or more financial credentials;
an executable portion configured to determine whether the device record used in the execution of the transaction meets a condition of the block chain distributed ledger, wherein the block chain distributed ledger comprises one or more device records and past transactions executed by the user using the one or more device records with one or more financial institutions, wherein the past transactions comprise at least information associated with the transactions executed by the user with a first source institution and a second source institution, wherein the condition of the block chain distributed ledger comprises at least one or more logic/rules associated with a smart contract associated with the financial institution;
an executable portion configured to analyze the block chain distributed ledger to determine a pattern associated with the past transactions executed by an entity stored in the block chain distributed ledger;
an executable portion configured to compare the information associated with the transaction with the pattern associated with the past transactions to determine a match; and
an executable portion configured to determine that the device record used in the execution of the transaction meets the condition of the block chain distributed ledger;
an executable portion configured to determine a match between the information associated with the transaction and the pattern associated with the past transactions stored in the block chain distributed ledger;
an executable portion configured to authorize the execution of the transaction based on at least determining that the device record used in the execution of the transaction meets the condition of the block chain distributed ledger, and determining the match between the information associated with the transaction and the pattern associated with the past transactions stored in the block chain distributed ledgers;
an executable portion configured to transmit a notification to one or more validation nodes to validate the device record based on at least the logic/rules of the smart contract associated with the financial institution;
an executable portion configured to receive an input from the one or more validating nodes validating the device record; and
an executable portion configured to post the device record to the block chain with a signature and an authentication key indicating that the mobile device is validated based on at least determining that the device record used in the execution of the transaction meets the condition of the block chain distributed ledger.

16. The computer program product of claim 15 further comprising an executable portion configured to:
receive a request from a user to enable the mobile device to be used as a payment instrument for conducting a transaction;
initiate a presentation of a user interface for display on the mobile device of the user, wherein the user interface comprises one or more financial institution accounts associated with the user;
receive, via the user interface, a user selection of at least one of the one or more financial institution accounts, wherein the user selection indicates that funds from the selected financial institution accounts be used in any transaction executed by the user using the mobile device; and
receive, via the user interface, one or more financial credentials associated with the selected financial institution accounts to be stored on the mobile device.

17. The computer program product of claim 15 further comprising an executable portion configured to:
receive a request from the financial institution to access the block chain;
determine that a financial institution associated with the financial credentials is a member institution;
enable the financial institution to access the block chain;
receive a request from the financial institution to post the device record to the block chain; and
post the device record to the block chain.

18. The computer program product of claim 17 further comprising an executable portion configured to:
enable the financial institution to validate the device identity prior to adding the device record to the block chain.

19. The computer program product of claim 17 further comprising an executable portion configured to:
receive one or more authentication credentials from the financial institution to enable the financial institution to access the block chain;
validate the one or more authentication credentials; and
enable the financial institution to access the block chain in response to validating the one or more authentication credentials.

20. The computer program product of claim 15 further comprising an executable portion configured to:
establish a communication link with the mobile device, wherein establishing further comprises creating a wireless data channel with the mobile device;
initiate, via the established communication link, a presentation of a user interface, the user interface comprising one or more mobile devices used by the user to execute the transaction;
receive, via the established communication link, a user selection of a mobile device indicating that the selected mobile device is the most current mobile device being used to execute transactions;
retrieve device information associated with the selected mobile device; and
update the block chain with the device information associated with the selected mobile device.

* * * * *